April 20, 1937.  A. CHIRCA  2,078,057
LIQUID METER
Filed Nov. 11, 1935

INVENTOR.
AXENTE CHIRCA
BY Kwis, Hudson & Kent
ATTORNEYS.

Patented Apr. 20, 1937

2,078,057

UNITED STATES PATENT OFFICE 2,078,057

LIQUID METER

Axente Chirca, Cleveland, Ohio

Application November 11, 1935, Serial No. 49,240

3 Claims. (Cl. 73—229)

This invention relates to improvements in liquid meters, particularly meters for the measurement of liquids having a tendency to foam, as for instance beer.

One of the objects of the invention is the provision of a meter so constructed as to accurately measure the flow of a liquid without materially agitating it.

Another object is the provision of an air pocket in a meter designed to measure liquid fed under pressure in order that a cushioning action may be provided, tending to eliminate pulsation.

Another object is the provision of a meter of the kind stated wherein appreciable clearance is provided between the casing and that portion of each vane which extends into the air pocket, thereby permitting free movement of the rotor through the air pocket and preventing the transference of air from the pocket down into the liquid in the meter casing, which would tend to mix air with liquid and cause churning and foaming.

Other objects and features of novelty will appear as I proceed with the description of that embodiment of the invention which, for the purposes of the present application I have illustrated in the accompanying drawing, in which Fig. 1 is a plan view of a meter embodying the invention, the casing of the meter being shown in horizontal section corresponding substantially to the line 1—1 of Fig. 2.

Figure 3:
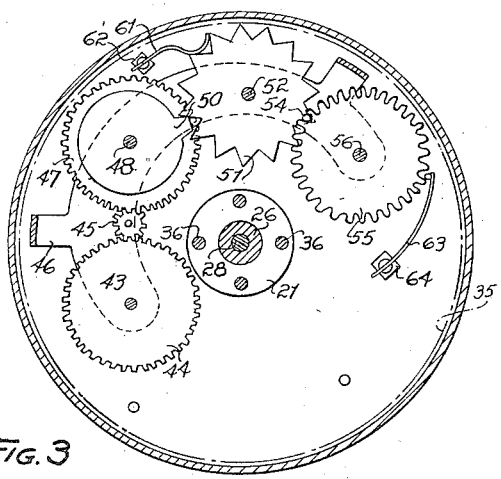
Fig. 3 is a vertical sectional view taken substantially on the line 3—3 of Fig. 1.
Figure 4:
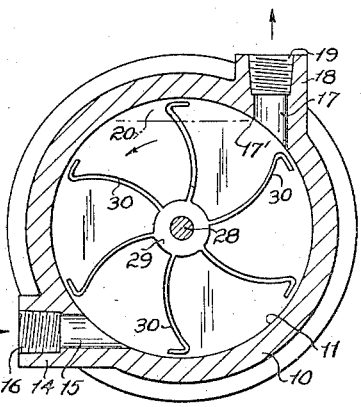
Fig. 4 is a vertical sectional view on a smaller scale, showing the rotor casing and the rotor therein, the view being taken substantially on the line 4—4 of Fig. 1.
Figure 1:
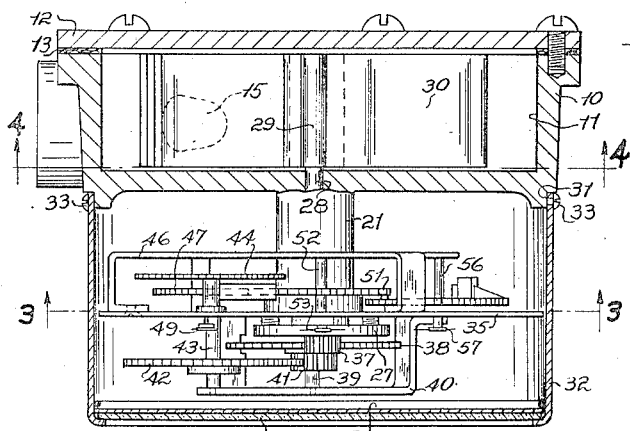
Figure 5:
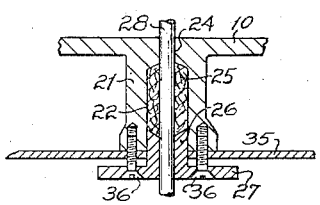
Fig. 5 is a detail sectional view showing the packing around the rotor shaft to prevent the leakage of liquid into the register housing.
Figure 2:
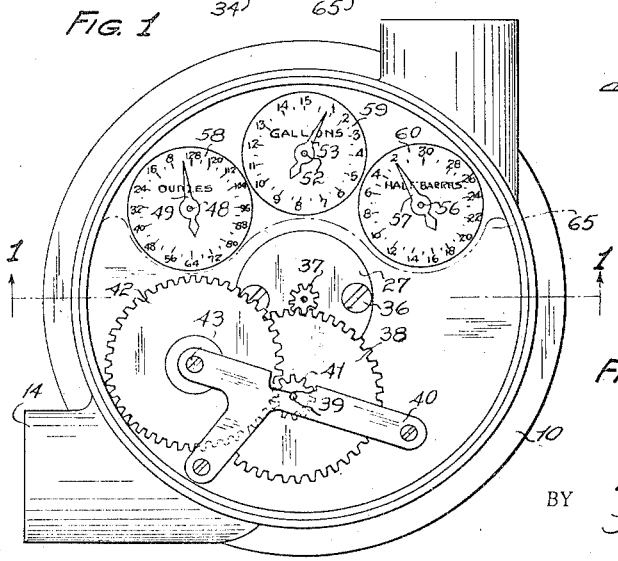
Fig. 2 is a front elevation of the meter.

In the drawing I have shown at 10 a casing so formed as to provide a cylindrical chamber 11 which is closed on one side by a removable disk 12, the joint being sealed by a suitable gasket 13.

Near the bottom of the casing there is an integral boss 14 in which is formed an approximately tangential intake port 15, this boss being provided with pipe threads 16 for the reception of a pipe (not shown) leading to a barrel or other container in which the liquid to be measured is stored, as for instance a beer keg. As ordinarily arranged, the beer in the keg is placed under a suitable air pressure of ten to fifteen pounds.

Near the top of the casing, approximately 180° from the intake port 15, there is a tangential exit port 17 which takes a vertical direction, being formed in a boss 18 which is threaded at 19 to receive a connection (not shown) leading to a delivery valve or spigot. The highest point 17' of the intersection of port 17 with the peripheral wall of chamber 11 is at a level which is substantially beneath the top of the chamber 18, whereby an air pocket 20 is formed above the level of the liquid in the casing.

On the forward side of casing 10, at the center thereof, there is an integral boss 21 with a cylindrical pocket 22 therein concentric with a bearing opening 24. Within the pocket I mount packing 25 which is compressed and held by a packing gland 26, the latter merging into a plate or disk 27.

A central shaft 28 extends through the packing gland 26 and has bearing therein and in the bearing opening 24 of casing 10. On the shaft 28 within casing 10 there is fixed a rotor comprising a hub 29 and a series of evenly spaced vanes 30 which are preferably formed in one piece with the hub. These vanes are concavo-convex, and so arranged that their convex sides are presented to the flow of liquid entering the casing from the port 15. The end of each vane is formed with a foot which is turned toward the convex side of the vane and preferably conforms approximately with the curvature of the casing.

The rotor does not have a close fit in the casing 10. There is clearance at all points between the casing and the rotor so as to prevent friction, and at the outer ends of the vanes particularly. The clearance either between the ends of the vanes and the periphery of the casing or between the sides of the vanes and the side walls of the casing, or both, is such that the movement of the vanes through the air pocket 20 does not force air into the liquid. This is an important feature of the invention, because if this clearance were not sufficient and air were thus mixed with the liquid and churned into it by the rotation of the vanes, there would be bubbling and foaming of the liquid, particularly in the case of beer for which the present invention is intended primarily.

On the forward side of casing 10 I form an annular rabbet 31 which receives a sheet metal cylindrical housing 32 that is secured to the casing 10 by screws 33. A glass 34 closes the forward end of the casing 32. Within this housing the register mechanism of the meter is located. While the present invention is not concerned with the details of this mechanism, it may be in order to briefly describe the particular mechanism herein illustrated.

Upon the forward end of the central boss 21 there is supported a circular disk or plate 35, this disk being held in position by screws 36 projected through holes in the plate 27 and threaded into tapped holes in the boss. The shaft 28 extends forwardly beyond the plate 27 and carries on its extremity a pinion 37 which meshes with a gear 38 that is mounted upon a shaft 39. This shaft has bearing at one end in the disk 35 and at the other end in a bracket 40 which is mounted upon the disk. Also mounted upon the shaft 39 there is a pinion 41 which meshes with a gear 42 mounted on a shaft 43, which is also supported in bearings in the bracket 40 and disk 35.

The shaft 43 extends rearwardly beyond the disk 35, and behind that disk it carries a gear 44. This gear meshes with a wide pinion 45 mounted upon a shaft which has bearing partly in the disk 35 and partly in a second bracket 46 that is attached to the rear side of the disk. This pinion also meshes with a gear 47 which is supported upon a shaft 48 mounted in the disk 35 and bracket 46, and extending forwardly through the disk where it carries an indicating hand 49.

Moving with the gear 47 there is a disk 50 with a single tooth which engages once for each revolution with a star wheel 51 mounted on a shaft 52 which extends forwardly through the disk 35, where it carries an indicating hand 53. On the wheel 51 there is a pin 54 that engages once for each revolution of the wheel with one of the teeth of a further gear or star wheel 55 that is mounted on a shaft 56 which extends forwardly through the disk 35 and there carries an indicating hand 57. Three gauge dials 58, 59 and 60 are engraved on the face of disk 35 concentric with the hands 49, 53 and 57, respectively, these dials reading preferably in liquid ounces, gallons and half-barrels.

It will be apparent that as the shaft 28 is turned by the flow of liquid through the casing 10 from the intake port 15 to the discharge port 17, the motion is transmitted by way of pinion 37, gear 38, and pinion 41 to gear 42, and then through shaft 43 to gear 44 and by way of pinion 45 and gear 47 to shaft 48 carrying the hand 49 by means of which fluid ounces are registered. For each complete rotation of the shaft 48 the star wheel 51 is advanced one tooth to register an additional gallon, and is held in that position by a leaf spring 61 attached to a post 62 which is anchored in the disk 35. When the star wheel 51 makes a complete revolution the pin 54 advances wheel 55 one tooth, causing indicating hand 57 to register an additional half-barrel. The wheel 55 is held against movement at other times by another leaf spring 63 mounted in a post 64 anchored in the disk 35.

In the operation of the meter, when pressure at the delivery end of the line is relieved by the opening of the faucet, flow of liquid starts through the casing 10 in a circular anti-clockwise direction. The vanes 30 are very light in weight and move easily with the liquid. As each vane passes the discharge port a quantity of liquid behind it flows through that port, but sufficient liquid remains in the casing at all times to maintain therein a constant liquid level determined by the height of the point 17'. As the vanes pass the port 17 there is some tendency toward interruption of liquid flow, in other words some tendency to produce pulsations in the flow, but this is overcome to a considerable extent by the air in air pocket 20. Substantial clearance being maintained between the ends of the vanes and the walls and periphery of the casing, the movement of the outer ends of the vanes through the pocket 20 does not force any air out of that pocket into the body of liquid.

The meter therefore does not perceptibly agitate the liquid, and there is no formation of foam. Hence the operation of the meter is accurate even when liquids like beer are measured.

The gears 37, 38, 41 and 42, and the bracket 40 are preferably concealed, and the concealment may be effected by the use of a metallic screen 65 placed preferably behind the glass 34.

Having thus described my invention, I claim:

1. In a liquid meter, a cylindrical chamber arranged with its axis horizontal, a rotor with outwardly extending vanes fixedly mounted thereon, said chamber having an approximately tangential inlet port near the bottom thereof, and having an exit port positioned above the said axis and below the top of the chamber, whereby an air pocket is formed in the top of the chamber, said vanes being convex on their sides away from the direction of rotation of the rotor, and having feet at their outer ends extending rearwardly with respect to the direction of rotation, there being a substantial clearance between the vanes and the chamber wall at said air pocket.

2. In a liquid meter, a cylindrical chamber arranged with its axis horizontal, a rotor mounted therein having vanes that are convex on their rear sides, said vanes being rigidly mounted on the rotor, said chamber having a horizontal approximately tangential inlet port at the bottom thereof to one side of the rotor axis arranged to deliver liquid against the said convex rear sides of the vanes, and said chamber having a vertical outlet slightly below the top thereof on the opposite side of the rotor axis.

3. In a liquid meter, a cylindrical chamber arranged with its axis horizontal, a rotor with outwardly extending vanes rigidly mounted therein, said chamber having an approximately tangential inlet port near the bottom thereof, and an exit port with a vertically disposed portion in communication with said chamber, said port being positioned above the axis of rotation of said rotor and below the top thereof, whereby an air pocket is formed in the top of the chamber, said chamber and vanes being so proportioned as to leave an appreciable clearance between the chamber and those portions of the vanes which pass through the air pocket.

AXENTE CHIRCA.